Figure 4:
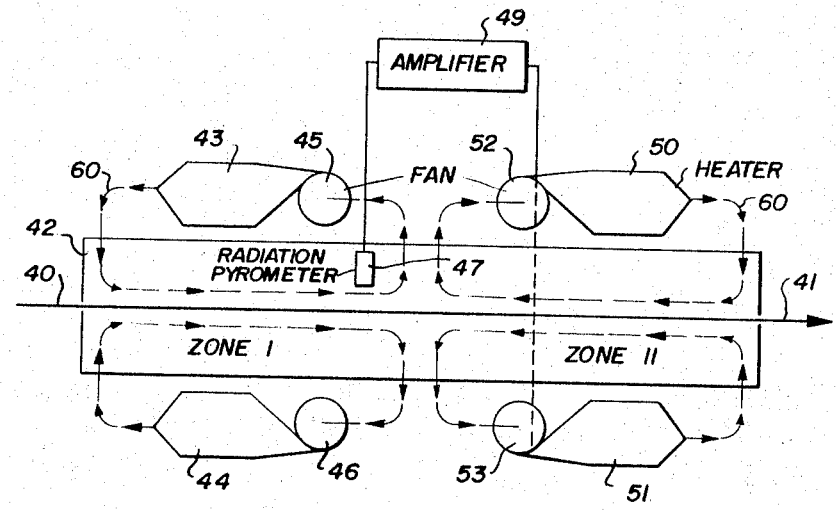

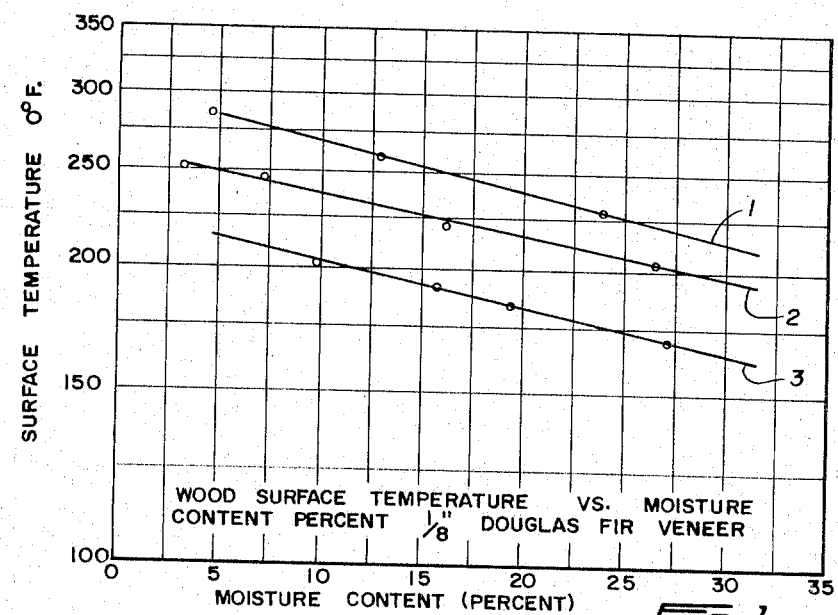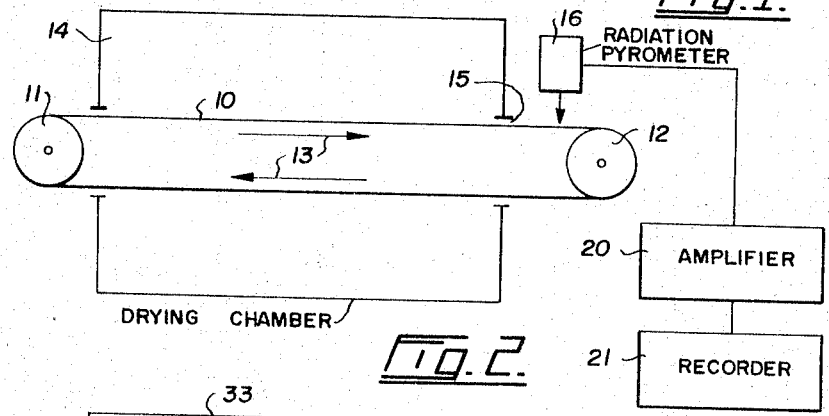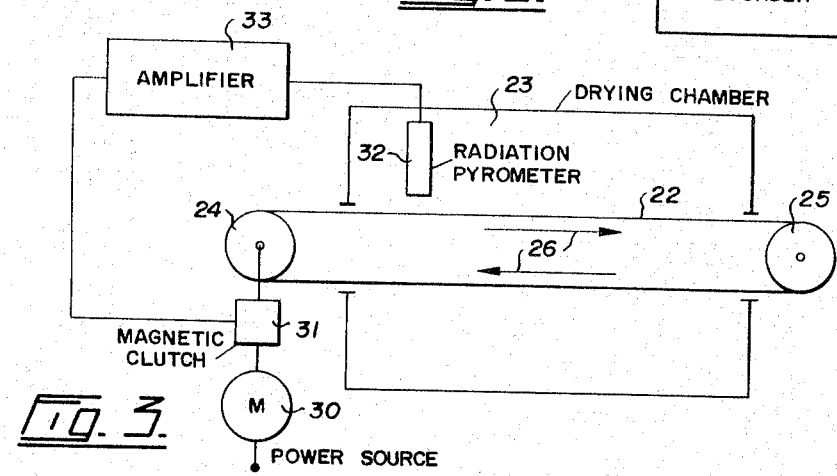

3,350,789
METHOD OF DETERMINING THE MOISTURE CONTENT OF THIN POROUS MATERIALS
Raymond D. Davies, White Rock, British Columbia, Canada, assignor to Crown Zellerbach Canada Limited, Vancouver, British Columbia, Canada, a corporation of Canada
Continuation of application Ser. No. 355,875, Mar. 30, 1964. This application Nov. 23, 1966, Ser. No. 596,730
9 Claims. (Cl. 34—30)

This application is a continuation of my previous application, Ser. No. 355,875 filed Mar. 30, 1964.

This invention relates to the determination of the moisture content of thin porous materials and more particularly to the continuous determination of the moisture content of such materials while they are in motion in the course of processing. On another aspect this invention also relates to the controlling of process variables in the processing of thin porous materials in order to maintain the moisture content of these materials at a desired level.

There are numerous processes in which products are conveyed through conditioning chambers, reaction chambers, or over rolls for the purpose of heating or changing the physical and/or chemical characteristics of the product. In these processes it is often quite important that the moisture content of the product emerging from the process be determined accurately and controlled within close limits. In order to effect satisfactory control it is also desirable that the moisture content of the material at some intermediate point in the process be accurately determinable so that proper steps may be taken to maintain the moisture content of the material, as it emerges from the process, within the desired limits. It is in such processes that the present invention has particular applicability.

A known method of determining the moisture content of a moving web of material is based on the principle that when a quantity of heat is supplied to the web the resulting temperature rise will bear a definite, but rather complex, relationship to the moisture content of the web material. The apparatus suitable for determining moisture content in accordance with this principle comprises a heating roll adapted to supply heat to a moving web at a constant rate, and temperature sensing rolls in contact with the web and located on either side of the heating roll for the purpose of measuring the rise in the temperature of the web resulting from the addition of heat through the heating roll. To this end the temperature sensing rolls contain thermocouple junctions which are electrically connected through slip rings and brushes, to apparatus calibrated to read directly in percent moisture content of the web material.

This apparatus, or apparatus for determining moisture content in accordance with this principle has several significant limitations. One of these limitations stems from the fact that the relationship between temperaure rise and moisture content is dependent, at least in part, upon the thickness, density and velocity of the web whose moisture content is being determined. In many applications, for instance in paper and textile processing, the thickness, density and velocity of the web will vary within and between production runs, so that the measurement of heat input and temperature rise alone will not yield a precise moisture content determination. Another serious limitation lies in the fact that the temperature of the web before and after heating is determined indirectly by measurement of the temperature of the heat sensing rolls which may also be used to convey the web. Since these temperature sensing rolls have a relatively large mass, they respond rather slowly to changes in the surface temperature of the web being conveyed, with the result that temperature readings are averages and the actual temperature of the web at any particular instant is not accurately known. In addition, this response time may not be the same for both rolls so that additional errors creep into the moisture content determination, and further, since the temperature measurements depend upon the use of slip rings and brushes whose electrical characteristics are subject to variation through wear, the temperature measurements and consequently the moisture content determination will be subject to additional error.

According to another known method the moisture content of a moving web of material is determined by measuring the electrical conductivity of the material and utilizing a relationship between electrical conductivity and moisture content to determine the moisture content of the material under consideration. The electrical conductivity of the material is measured by means of two adjacent roller electrodes in contact with the material and on opposite sides of it, and the moisture content of the material is indicated directly by an electrically operated meter connected to the roller electrodes through slip rings and brushes. Moisture content measurements taken by this method however are subject to a number of errors and are generally inaccurate. For example, static electricity and changes in conductivity unrelated to moisture content leave the moisture content readings open to error. In addition the slip rings and brushes required to transmit an electrical signal from the roller electrode to a recording or indicating meter are subject to wear with the result that their electrical characteristics vary with a consequent reduction in the reliability of the moisture content determination.

It has been found that, for the determination of the moisture content of thin porous materials having a consistent surface temperature-moisture content relationship, the disadvantages of the known methods for the determination of the moisture content of materials may be overcome in accordance with this invention which, in one aspect, comprises the steps of transferring heat to such material, absorbing thermal radiation from the surface of the material and utilizing the absorbed thermal radiation in determining the moisture content of the material. The thermal radiation, which is indicative of the surface temperature of the material, may be utilized in the moisture content determination by transforming it into an electrical signal, amplifying the signal and utilizing the amplified signal to actuate a recording or indicating device which has been calibrated, in accordance with the surface temperature-moisture content relationship of the material whose moisture content is being determined, to read directly in percent moisture content. The amplified electrical signal, in addition to being utilized to actuate the recording or indicating device may also be used to control processing variables which effect the moisture content of the material under consideration for the purpose of controlling the moisture content of this material. In another aspect, the invention comprises apparatus for use in the processing of a thin porous material having a consistent surface temperature-moisture content relationship comprising a drying zone, means for passing said material through the drying zone, means for transferring heat to said material, means within said drying zone for absorbing thermal radiation from said material, means for transforming said thermal radiation to an electrical signal, and means for amplifying said electrical signal whereby said electrical signals may be utilized to determine the moisture content of the material.

Since the method of determining the moisture content of thin porous materials in accordance with this invention depends upon thermal radiation from the surface of the materials it eliminates the necessity of having thermally or electrically responsive elements in contact with the surface of the material and consequently is not subject to errors introduced by the use of electrodes, brushes or slip rings which are subject to wear. In addition, temperature measuring devices in physical contact with the material whose moisture content is to be determined have a relatively large mass, and therefore respond rather slowly to changes in surface temperature, whereas the utilization of thermal radiation in accordance with this invention permits a virtually instantaneous response to changes in surface temperature. These advantages may be obtained with equipment which is relatively inexpensive and consequently, this invention is of great commercial importance in its field of application.

In drawings which illustrate embodiments of this invention,

FIGURE 1 is a semi-logarithmic graph illustrating the wood surface temperature-moisture content relationship for Douglas Fir Veneer under various drying conditions, FIGURE 2 is a schematic diagram of apparatus for determining the moisture content of a thin porous material in accordance with this invention, FIGURE 3 is a schematic diagram of apparatus for controlling the moisture content of a thin porous material as it emerges from a drying zone in accordance with the invention, and FIGURE 4 is a schematic diagram of another embodiment of apparatus for controlling the moisture content of a thin porous material as it emerges from a drying zone in accordance with the invention.

The method and apparatus for determining the moisture content of thin porous materials in accordance with this invention are derived from results, obtained experimentally, which indicate that the surface temperature of a thin porous material from which water is evaporating bears a definite relationship to the moisture content of that material. For example, experiments with thin wood sections show a simple surface temperature-moisture content relationship of the form $$T = \frac{a}{b^m}$$

where $T$ = surface temperature of the wood section
$m$ = percentage moisture content of the wood section
and
$a$ and $b$ are constants dependent upon the conditions causing the thin wood section to dry.

These conditions include such factors as temperature and circulation rate of the drying medium, the intensity of the radiant energy directed toward the material whose moisture content is being determined, surface characteristics of this material and direction of circulation relative to this material. $a$ and $b$ therefore may be established experimentally for any known drying conditions.

FIGURE 1 illustrates the experimental results, plotted on semi-logarithmic paper, of moisture content determinations in respect of ⅛″ thick Douglas Fir Veneer for the conditions resulting in heat being transferred to the material as set out in Table 1.

TABLE I

| Curve | Temperature of Heat Transferring Medium (° F.) | Circulation Rate of Heat Transferring Medium Impinging at 90° to the Wood Surface (f.p.m.) |
| --- | --- | --- |
| 1 | 550 | 9,000 |
| 2 | 450 | 5,000 |
| 3 | 350 | 7,000 |

For the results illustrated graphically in FIGURE 1, the heat transferring medium comprised hot gases, the products of natural combustion. Curve 1 of FIGURE 1 shows the relationship between surface temperature and moisture content of a ⅛″ thick Douglas Fir Veneer section being dried in an atmosphere of 550° F. impinging at 90° to the surface of the wood at 9,000 feet per minute. Under these conditions a wood surface temperature of 250° F. for example, would indicate a moisture content of 16.5%. The other curves, 2 and 3, are comparable to curve 1 but for different conditions of the heat transfer-ring medium, as may be seen from Table 1.

Turning now to FIGURE 2 in which the drying stage of an industrial process is illustrated, conveyor belt 10 passes over rolls 11 and 12 and is driven in the direction indicated by arrows 13. The upper surface of conveyor belt 10 carries the thin porous material being dried although this material is not illustrated in the drawing. Conveyor 10 carries the material into and through a drying chamber 14, in which the material is subjected to a drying atmosphere whose temperature and circulation rate are known. As the thin porous material emerges from the drying chamber at 15 the thermal radiation from the surface of this material, indicative of the surface temperature of the material, is absorbed by radiation pyrometer 16, and there converted into an electric signal. As the surface temperature of the material bears a definite relationship to the moisture content of the material as illustrated in FIGURE 1, the thermal radiation from the material absorbed by the radiation pyrometer, and consequently the electrical signal will also bear such a relationship to the moisture content of the material. This electrical signal is amplified by a suitable electrical amplifier 20 and then utilized to actuate a moisture content recording or indicating device 21 which may be calibrated to read directly in percent moisture content. The radiation pyrometer, amplifier and recorder used in this apparatus are well known elements and they do not, in themselves, form a part of this invention.

Although in the apparatus illustrated in FIGURE 2 of the drawings a radiation pyrometer is used to convert the thermal radiation into an electrical signal, any other suitable thermal radiation sensitive device may be used. For example, a bolometer or radiometer may be substituted for the radiation pyrometer depending upon which device is more readily available and most suitable for the purpose.

The amplifier used can be any suitable direct current amplifier, or, as is often the case, if an A–C amplifier is more readily commercially available this may be used with a converter interposed in the circuit between the radiation pyrometer and the amplifier for the purpose of converting the direct current from the radiation pyrometer into A–C current to be amplified by the amplifier.

The moisture content recording or indicating device may be any suitable device for transforming the electrical signal from the amplifier into a visual indication of the percentage moisture content of the thin porous material whose moisture content is being determined. It is only necessary that the recording or indicating device be calibrated in accordance with the relationship $$T = \frac{a}{b^m}$$

so that the electrical signal indicative of surface temperature will produce a visual indication of percent moisture content. The moisture content recording or indicating device may be either A-C or D-C operated depending upon the type of amplifier used as discussed above. Or, if a D-C operated recorder is to be used with an A-C amplifier or vice versa a suitable converter may be interposed in the circuit between the amplifier and the recorder.

FIGURE 3 illustrates apparatus suitable for controlling the moisture content of a thin porous material by varying the speed at which the material is conveyed through a drying chamber. The apparatus comprises a conveyor belt 22 passing over rolls 24 and 25 and driven in the direction indicated by arrows 26. The conveyor 22 carries the thin porous material on the upper surface thereof although this material is not illustrated in the drawing. Conveyor belt 22 is driven by drive roll 24 which in turn is rotated by motor 30 connected to a suitable source of power. Interposed between the drive roll 24 and the motor 30 is a variable speed coupling such as a magnetic clutch 31. Conveyor 22 carries the thin porous material into and through drying chamber 23 where it is subjected to a drying atmosphere whose temperature and circulation rate are known. Located inside the drying chamber and preceded by a section thereof is radiation pyrometer 32 which absorbs thermal radiation from the surface of the thin porous material being dried and converts it into an electrical signal. This electrical signal which, as previously discussed, is proportional to the moisture content of the material, is amplified in amplifier 33 and applied to the control winding of the magnetic clutch to determine the degree of coupling between the motor 30 and drive roll 24.

In order to control the moisture content of the thin porous material with this apparatus the known temperature and circulation rate of the drying medium within drying chamber 23 must be kept constant throughout the process. Since the properties of the material to be dried are known it is possible to determine the drying effect for the drying conditions in the drying chamber at various conveyor speeds and, it is possible to determine the conveyor speed which will give a particular desired final moisture content of the material to be dried assuming a particular initial moisture content of the material. It is also possible to estimate under these conditions the moisture content of the material at the radiation pyrometer given the assumed initial moisture content. Therefore, the variable speed clutch may be so adjusted that when the initial moisture content of the material is at the assumed value the amplified electrical signal from the radiation pyrometer will produce a coupling effect at the magnetic clutch to drive the conveyor at the speed which will result in the desired final moisture content of the material as it emerges from the drying chamber. The clutch may also be adjusted or calibrated for the conditions resulting in heat being transferred to the material so that variations in the moisture content of the material at the radiation pyrometer, and consequently variations in the electrical signal from the radiation pyrometer, will vary the coupling effect of the clutch and thus the speed of the conveyor, whereby to maintain the final moisture content of the material at the desired value. For example, if the actual initial value of the moisture content of the material is the same as the assumed value then the signal from the radiation pyrometer will be as anticipated, and the coupling effect of the clutch and the conveyor speed will be the speed calculated to produce the desired final moisture content of the material. However, if the initial moisture content of the material is higher than the assumed value then the moisture content of the material at the radiation pyrometer will also be higher and the electrical signal from the radiation pyrometer will vary the coupling effect of the magnetic clutch in accordance with its calibration and will produce a slower conveyor speed so that the material to be dried will be exposed to the drying conditions for a longer period to bring the final moisture content of the material down to the desired value. Similarly, if the initial moisture content of the material is lower than the assumed value, then the conveyor speed will be increased since less exposure to the drying medium will be required to produce the desired final moisture content value.

It will be evident that the thermal radiation method of determining moisture content may be utilized to control other processing variables than conveyor speed for the purpose of arriving at a desired final moisture content level.

FIGURE 4 illustrates apparatus for controlling the final moisture content of web material passing through a dryer by varying the temperature and/or circulation rate of the drying medium within the dryer. According to this embodiment, a web of material 40 is passed in the direction of arrow 41, through a drying chamber 42 at a constant speed. Within the drying chamber there are two zones, the temperature and circulation rate of the drying medium of Zone I being fixed and the temperature and/or circulation rate of the drying medium of Zone II being variable. In Zone I the temperature of the drying medium is governed by heaters 43 and 44 while the circulation rate of the drying medium is governed by blowers 45 and 46, the direction of circulation being indicated by arrows 60. In Zone II the temperature of the drying medium is governed by heaters 50 and 51 whereas the circulation rate of the drying medium is governed by blowers 52 and 53. Again, the direction of circulation is indicated by arrows 60. The circulation pattern in the two zones is such that there is little or no mixing of their atmospheres and the atmosphere in Zone I is not materially affected by variations in the atmosphere of Zone II.

Located within Zone I, and preferably about 5 feet from the exit end thereof is a radiation pyrometer 47 which absorbs thermal radiation from the surface of the material 40 and converts it to an electrical signal which is amplified in amplifier 49 and applied to control the output of heaters 50 and 51 and/or the speed of blowers 52 and 53.

The signals from the pyrometer being proportional to the moisture content of the material 40, the control is effected in a similar manner to that described in the embodiment of FIGURE 3. That is, the temperature and circulation rate of the drying medium in Zone I being known and constant, the signal from the radiation pyrometer may be compared with a signal predicted on the basis of an assumed moisture content of the material entering the dryer. The extent to, and manner in which the actual signal from the radiation pyrometer from the expected signal will govern the extent to, and manner in which the output of heaters 50 and 51 and/or the speed of blowers 52 and 53 are varied to produce a desired final moisture content upon the exit of material 40 from the drying chamber 42. For example, if the signal from the radiation pyrometer indicates a higher moisture conduct than that predicted, the output of heaters 50 and 51 and/or the speed of blowers 52 and 53 will be increased, in accordance with their precalibration, to ensure that the moisture content of the material leaving the drying chamber is at a desired level.

It will be readily apparent that, while only temperature and circulation rate of the drying medium are referred to as variables in connection with FIGURE 4, other factors such as the intensity of radiant energy directed at the material being dried may be varied in a similar manner.

The method for determining the moisture content and controlling the moisture content of thin porous materials as described herein may be applied to any thin porous material such as wood, coatings, textiles, pulverised minerals, plastics, plaster board, carpeting, asbestos, paper, pulp, rubber, clay and foods. In addition, the technique can be used to measure not only moisture content, but also the liquid content of materials where the liquid is any volatile substance. The relationship between temperature and moisture content does not have to be of any special form in order to be useful for moisture content determinations, however, it is important that the material possess a surface temperature moisture content relationship which is consistent. That is, the surface temperature moisture content relationship for a given material should be constant for a given set of conditions causing the material to dry.

I claim:

1. In the processing of a thin porous material having a consistent surface temperature-moisture content relationship wherein said processing is subject to conditions causing said material to dry, and the moisture content of the material to decrease, a method comprising the steps of establishing the surface temperature-moisture content of said material by the formula $$T = \frac{a}{b^m}$$

in which T is the surface temperature of the material, $a$ and $b$ are constants dependent upon the conditions causing the thin porous material to dry and $m$ is the moisture content of the material expressed in percent, exposing said material to moisture evaporation conditions to cause evaporation of moisture therefrom, absorbing thermal radiation from the surface of said material, transforming said absorbed thermal radiation into an electrical signal, and utilizing said electrical signal in the determination of the moisture content of the material in conjunction with the above-mentioned constants.

2. A method as claimed in claim 1 wherein said electrical signal is utilized to vary the time during which said material is exposed to the moisture evaporation conditions.

3. A method as claimed in claim 1 wherein said electric signal is utilized to directly record the percentage moisture content of said material.

4. A method as claimed in claim 1 wherein said electric signal is utilized to control the conditions under which heat is transferred to said material at a stage in the processing of said material subsequent to that at which said thermal radiation is absorbed.

5. In the processing of a thin porous material having a consistent surface temperature-moisture content relationship wherein said processing is subject to conditions causing said material to dry, and the moisture content of the material to decrease, a method comprising the steps of establishing the surface temperature-moisture content of said material by the formula $$T = \frac{a}{b^m}$$

in which T is the surface temperature of the material, $a$ and $b$ are constants dependent upon the conditions causing the thin porous material to dry and $m$ is the moisture content of the material expressed in percent, passing said material through a drying zone, transferring heat to said material as it passes through said drying zone, absorbing thermal radiation from the surface of said material, transforming said absorbed thermal radiation into an electrical signal, amplifying said electrical signal, and utilizing said amplified electrical signal in the determination of the moisture content of the material in conjunction with the above-mentioned constants.

6. A method as defined in claim 5 wherein said amplified electrical signal is utilized to vary the speed at which said material is passed through the drying zone.

7. A method as claimed in claim 5 wherein said amplified electric signal is utilized to directly record the percentage moisture content of said material.

8. A method as claimed in claim 7 wherein said electrical signal is utilized to control the conditions under which heat is transferred to said material at a stage in the processing of said material subsequent to that at which said thermal radiation is absorbed, whereby to control the moisture content of the material passing from said driving zone.

9. A method as claimed in claim 8 wherein the thermal radiation is absorbed from said material at a point in its passage through said drying zone preceeded by the portion of said drying zone.

No references cited.

FREDERICK L. MATTESON, JR., *Primary Examiner.*

J. J. CAMBY, *Assistant Examiner.*